United States Patent
Wang

(10) Patent No.: US 8,344,865 B2
(45) Date of Patent: Jan. 1, 2013

(54) METHOD AND APPARATUS FOR MONITORING A VEHICULAR PROPULSION SYSTEM BATTERY

(75) Inventor: Fang Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 12/915,384

(22) Filed: Oct. 29, 2010

(65) Prior Publication Data

US 2012/0105220 A1 May 3, 2012

(51) Int. Cl.
*B60Q 1/00* (2006.01)

(52) U.S. Cl. ............... 340/438; 340/636.1; 340/636.13; 340/636.19

(58) Field of Classification Search .............. 340/438, 340/455, 636.1, 636.13, 636.19, 636.21; 324/426, 432, 522; 73/40; 320/137, 151, 320/156, 161
See application file for complete search history.

(56) References Cited

U.S. PATENT DOCUMENTS 6,573,728 B2  6/2003 Bhatia

*Primary Examiner* — Toan N Pham
(74) *Attorney, Agent, or Firm* — Dinsmore & Shohl LLP

(57) ABSTRACT

A method and apparatus for determining coolant leakage in a vehicular propulsion system battery. An AC isolation resistance test is used to determine whether an isolation fault has occurred within the battery, but can also determine the capacitance of the circuit or system, which can further determine the coolant leakage levels of the vehicular propulsion system battery. This eliminates having an additional device to measure the coolant leakage.

18 Claims, 2 Drawing Sheets

METHOD AND APPARATUS FOR MONITORING A VEHICULAR PROPULSION SYSTEM BATTERY

BACKGROUND

The present application generally relates to an apparatus and method for monitoring a vehicular propulsion system battery and, specifically, to monitoring the vehicular propulsion system battery to determine the presence of coolant leakage.

Hybrid and electric vehicles provide an alternative to conventional means of vehicular motive power by either supplementing (in the case of hybrids) or completely replacing (in the case of electric vehicles) the internal combustion engine (ICE). As such, at least a portion of the motive power in a hybrid or electric vehicle is provided by one or more battery packs that act as a direct current (DC) voltage source to a motor, generator or transmission that in turn can be used to provide the energy needed to rotate one or more of the vehicle's wheels. One form of battery that appears to be particularly promising for vehicular applications is known as a lithium-ion battery.

Because such battery packs form a significant part of the vehicle's propulsion system, it is important to monitor parameters associated with battery operation to ensure proper vehicular performance. Examples of such parameters include cell temperature, voltage, state of charge and so forth. Another such parameter is the coolant leakage.

Coolant leakage is an important parameter for a vehicular propulsion system battery, as it can lead to both a decrease in the efficiency of the battery thermal system as well as an increased likelihood that the system will overheat. Coolant leakage can also create a short circuit for the entire system. It can cause an isolation fault (voltage leaking from the main battery to the chassis) within the system. Finally, coolant leakage will limit the overall life of the battery.

Conventionally, a separate device is needed within a vehicular system battery to measure coolant leakage; however, one form of test known as an AC isolation resistance test can be performed both to determine whether an isolation fault has occurred and to determine coolant leakage without the need for an extra device. The conventional AC isolation resistance test is performed by injecting an excitation signal into the system to generate a readback signal. The amplitude and phase of the readback signal is determined by the difference between the excitation signal and this readback signal.

It can be difficult to ascertain the small changes between the amplitudes and phases of the original and readback signals of the conventional AC isolation resistance test, especially if the system experiences certain conditions. Even a slight difference in system conditions can lead to a large error in the isolation resistance measurement. Such a conventional method also uses a predefined range for a quantity known as Y capacitance. Y capacitors are used in high voltage systems in order to reduce interference. They are typically exposed to transients and overvoltages within a system, and are generally installed for line-to-ground or neutral-to-ground connections. Y capacitors are intended to be used where failure could lead to electric shock if proper ground connection is lost and they operate by discharging (shunting) current to the ground. The obtained value can lead to errors if the actual Y capacitance value is outside of the predefined range. The isolation resistance measurement will be inaccurate, which will lead to a false isolation detection.

Accordingly, it is challenging and difficult to accurately determine whether an isolation fault has been detected. Likewise, it is challenging and difficult to perform an accurate AC isolation resistance measurement such that the obtained Y capacitance value can be related to a correct value for important system parameters such as coolant leakage for a vehicular battery.

SUMMARY

According to one aspect of the invention, a method for monitoring a vehicular propulsion system battery to determine the presence of coolant leakage is disclosed. The method comprises receiving a first capacitance related to discharge current of the battery. Then, a second capacitance related to discharge current of the battery is received. The first capacitance is compared to the second capacitance and related to a coolant leakage. Finally, the related information is provided to indicate coolant leakage.

Optionally, in this aspect, the first capacitance and the second capacitance are Y capacitances. The Y capacitances may be obtained from a plurality of waveforms, wherein the waveforms are filtered to generate a plurality of DC components. The DC components are then separated to receive an isolation resistance and the Y capacitances. The second capacitance may be continuously received. Additionally, providing the related information comprises conveying a sensory cue to the user. In one form, this may include using a gauge, audio alarm, warning light, or other means for alerting the user of a change in coolant leakage, i.e. a visual, light, sound or combinations thereof.

According to another aspect of the invention, an apparatus for monitoring a vehicular propulsion system battery to determine the presence of coolant leakage is described. The apparatus comprises a sensor for receiving a first and second capacitance related to discharge current of the battery, a processing component configured to compare the first and second capacitance, a relating mechanism for comparing capacitance to a coolant leakage, and an output source to a user to provide indicia of the coolant leakage. The processing component may be electrically connected to one or more sensors that may detect a coolant leakage.

Optionally, in this aspect, the first capacitance and the second capacitance are Y capacitances. The Y capacitances may be obtained from a plurality of waveforms, wherein the waveforms are filtered to generate a plurality of DC components. The DC components are then separated to receive an isolation resistance and the Y capacitances. The second capacitance may be continuously received. Finally, an output source to a user may provide the related information to a user to indicate coolant leakage, wherein the providing comprises conveying a sensory cue to a user. In one form, this may include using a gauge, audio alarm, warning light, or other means for alerting the user of a change in coolant leakage, i.e. a visual, light, sound or combinations thereof.

According to yet another aspect of the invention, a method for monitoring a fuel cell stack to determine the presence of coolant leakage is described. The method comprises receiving a first Y capacitance from a sensor coupled to the stack in such a way to measure the indicia of coolant leakage, receiving a second Y capacitance from a sensor coupled to the stack in such a way to measure the indicia of coolant leakage, comparing the first Y capacitance to the second Y capacitance, and providing a signal representative of the compared capacitances to a signal processing component. Optionally, the providing a signal representative of the compared capacitances comprises notifying a user of the coolant leakage. The signal processing component may be capable of responding, processing, receiving, transmitting or otherwise acting upon the capacitances to either maintain them or to convey indicia of a fuel cell leakage status to a user. The user may be an owner, operator or driver, or a person that may be assembling, servicing, or is otherwise responsible for overall fuel cell system well-being.

BRIEF DESCRIPTION OF THE DRAWINGS

Preferred embodiments will hereinafter be described in conjunction with the appended drawings, wherein like designations denote like elements and wherein.

DETAILED DESCRIPTION

Figure 1:
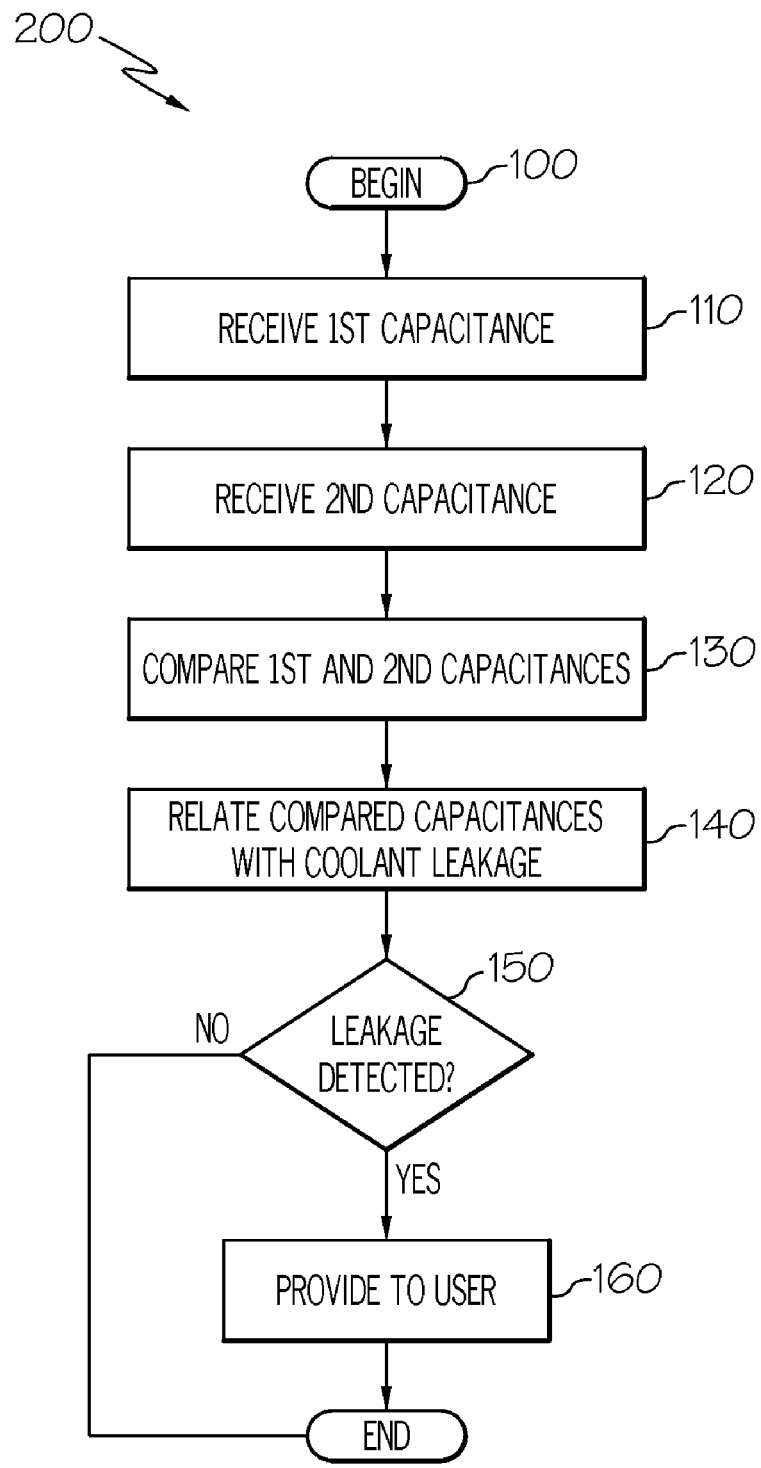
FIG. 1 is a flowchart of one embodiment of a method for monitoring a vehicular propulsion system battery to determine coolant leakage.

It should be understood that the application is not limited to the details or methodology set forth in the description or illustrated in the drawings. It should also be understood that the terminology is for the purpose of description only and should not be regarded as limiting.

A possible way to detect coolant leakage is to obtain the Y capacitance values within the system. The present disclosure provides for an accurate AC isolation resistance test to be performed on a vehicular propulsion system battery. In one form, the present disclosure uses the AC isolation resistance test to specifically determine the Y capacitance, which can be related to coolant leakage. Such a configuration reduces the need for an additional or separate device within the system to measure coolant leakage.

The present disclosure takes the readback signal from the isolation resistance test and multiplies it with a plurality of sinusoidal waveforms as a way to generate a plurality of DC components. One of the DC components determines the amplitude change. The other DC component determines the phase change. These DC components are more accurate and more readable than the previous method, because the previous method is highly sensitive to slight changes in system conditions. Thus, the DC components can be obtained with less noise from the system. The current method filters the DC components in order to determine both the isolation resistance and the Y capacitance.

Once the first capacitance value is received, a second capacitance value can be continuously received. The timing of the second capacitance allows for an overall faster detection time of the system. A comparison of the two Y capacitance values is performed. In one form, the comparison can be done through a calculation, a look-up table, or other methods known in the art. The compared capacitances may then be used to relate to a coolant leakage value. The compared capacitances may be related to coolant leakage by conducting tests on the battery, by a look-up table, or by other methods known in the art. Finally, the compared capacitances may be provided to a user or to a signal processing component.

FIG. 1 shows an illustration of one embodiment of a method for monitoring coolant leakage 18 in a vehicular propulsion system battery 10 in accordance with the present disclosure and shown generally at 200.

Method 200 begins when a vehicular propulsion system battery 10 is started 100. The battery 10 may be started 100 by a user, an event, or any other method known in the art. A first capacitance 110 related to the discharge current is received. The first capacitance 110 may be received from a source or several sources. In one embodiment, the first capacitance 110 is received from a sensor 26. In another embodiment, the first capacitance 110 is received from a processor. In yet another embodiment, the first capacitance 110 is received from a controller. The first capacitance 110 may include different types of capacitances. In one embodiment, the first capacitance 110 is a Y capacitance. In another embodiment, the first capacitance 110 is an X capacitance. In yet another embodiment, the first capacitance 110 may be any other type of capacitance received by the system. The first capacitance 110 may also be related to other system parameters, such as current, voltage, and so forth.

A second capacitance 120 related to the discharge current is received. The second capacitance 120 may be received from a source or several sources. In one embodiment, the second capacitance 120 is received from a sensor 26. In another embodiment, the second capacitance 120 is received from a processor. In yet another embodiment, the second capacitance 120 is received from a controller. The second capacitance 120 may include different types of capacitances. In one embodiment, the second capacitance 120 is a Y capacitance. In another embodiment, the second capacitance 120 is an X capacitance. In yet another embodiment, the second capacitance 120 may be any other type of capacitance received by the system. The second capacitance 120 may also be related to other system parameters, such as current, voltage, and so forth.

The second capacitance 120 may be continuously received by the system. In another embodiment, the second capacitance 120 may be stored within a memory component, a data repository, or any other storage device known in the art. Once the first capacitance 110 and the second capacitance 120 are received, a compared capacitance 130 is determined. The compared capacitance 130 may be stored within a memory component, a data repository, or any other storage device known in the art.

After the compared capacitance 130 is determined, related information 140 between the compared capacitance 130 and the coolant leakage 18 is found. In one embodiment, the related information 140 is determined from empirical data and continuous testing of the battery. The test may compare the isolation resistance values to the physical measurements of the battery at different conditions, such as coolant leakage level. When the coolant leakage level changes, the Y-capacitance also changes, because of its sensitivity to the leakage level. In another embodiment, the related information 140 is determined from a processing component 20 that operates upon a table, index or any other method known in the art. If coolant leakage 18 is present 150, then the related information 140 is provided 160 to a user 14 to indicate coolant leakage 18 with an output source 22. The term "providing" may include outputting, displaying, conveying, transmitting, receiving or the like to a device, display, or any other component known in the art such that the user can be either directly or indirectly made known of the coolant leakage 18 status.

In one embodiment, the output source 22 may provide a sensory cue that can be a visual, such as a picture, symbol, number, or display. In another embodiment, the output source 22 may provide a sensory cue that can be light, such as a dashboard light. In another embodiment, the output source 22 may provide a sensory cue that can be sound, such as a voice or beep. In yet another embodiment, the output source 22 may provide a sensory cue that is combinations of the preceding embodiments or any other sensory cue known in the art.

Figure 2:
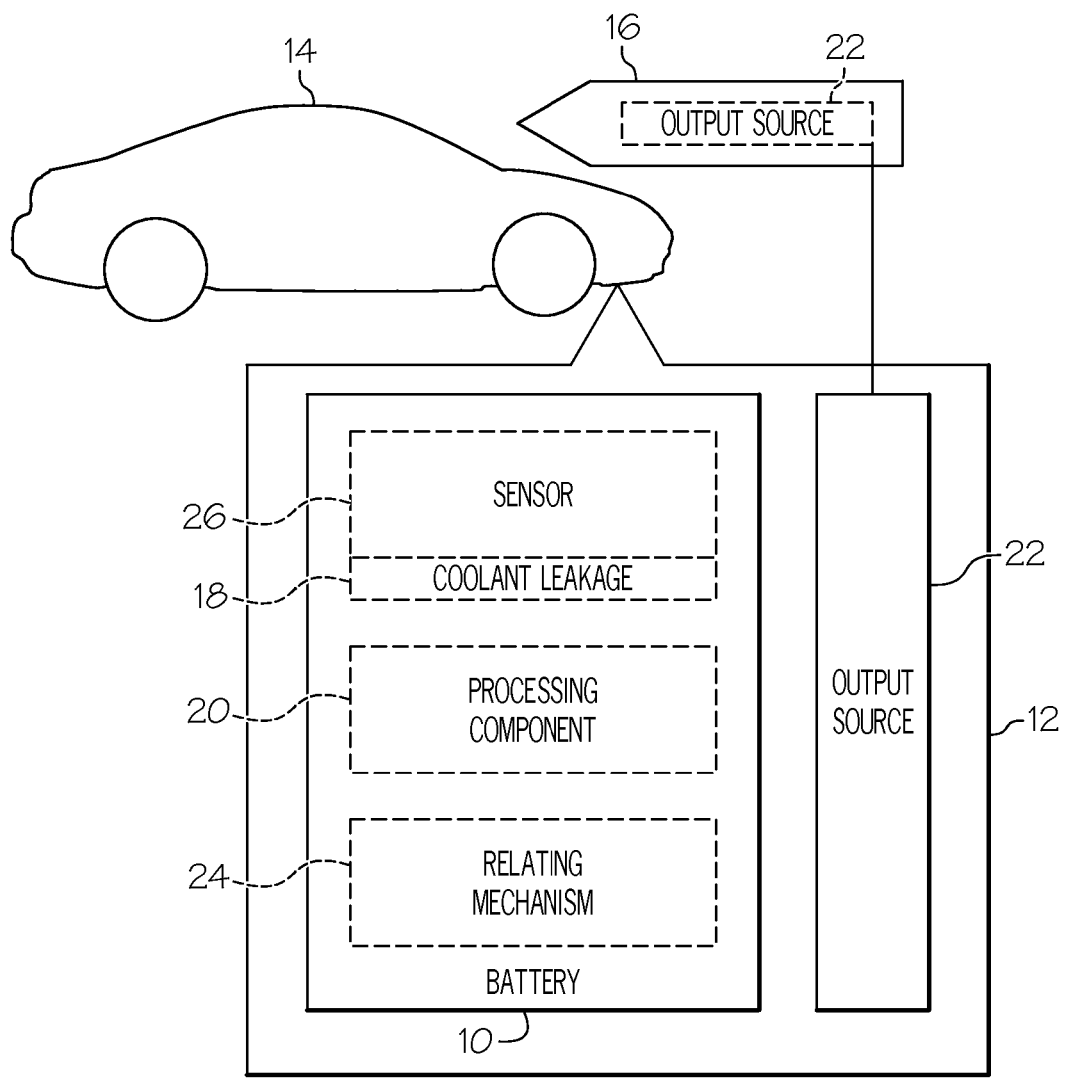
FIG. 2 is a block diagram showing an embodiment of a system capable of utilizing the method for monitoring a vehicular propulsion system battery to determine coolant leakage.

Referring to FIG. 2, a block diagram showing an embodiment of a system capable of one embodiment of a method for determining coolant leakage 18 and its applicable use within a vehicular propulsion system battery 10 is shown.

An example of a vehicular propulsion system battery 10 that is capable of the method for determining coolant leakage 18 discussed above is shown. The following paragraphs simply provide a brief overview of one such vehicular propulsion system battery 10, however, other systems not shown could employ the disclosed method as well.

A vehicle 12, generally includes a user 14 and the vehicular propulsion system battery 10. Vehicle 12 is preferably a mobile vehicle such as a motorcycle, car, truck, recreational vehicle (RV), boat, plane, moped, and so forth. Vehicle 12 is generally equipped with appropriate processing components 20 that allow it to perform various functions, including method 200, which further comprises communication to the user 14. A relating mechanism 24 for comparing the capacitances will also be present within the vehicle. If a coolant leakage is detected 150, then an output source 22 provides indicia of the coolant leakage 18 to a user 14.

The related information may be conveyed to a user 14 by an onboard device 16 that provides a variety of mechanisms, such as an output source 22 that can provide a sensory cue. The output source 22 is linked to the vehicular system battery 10 and may provide indicia of the coolant leakage 18 to the user 14. The output source 22 may provide a sensory cue that can be a visual, light, sound or combinations thereof or other known methods within the art. Such providing may also include an intermediate step, such as storing data related to the coolant leakage 18 in a storage repository that can be used to provide indicia of the leakage status to the output source 22.

While the present disclosure has been particularly shown and described with reference to specific embodiments, it should be understood by those skilled in the art that various changes in form and detail may be made therein without departing from the spirit and scope of the disclosure as defined by the appended claims.

What is claimed is:

1. A method for monitoring a vehicular propulsion system battery to determine the presence of coolant leakage therein, the method comprising:
   receiving a first capacitance related to discharge current of the battery;
   receiving a second capacitance related to discharge current of the battery;
   comparing the first capacitance to the second capacitance;
   relating the compared capacitance to a coolant leakage; and
   providing the related information to indicate coolant leakage.

2. The method of claim 1, wherein the first capacitance and the second capacitance are Y capacitances.

3. The method of claim 2, wherein the Y capacitances are obtained from a plurality of waveforms.

4. The method of claim 3, wherein the waveforms are filtered to generate a plurality of DC components.

5. The method of claim 4, wherein the plurality of DC components are separated to receive an isolation resistance and the Y capacitances.

6. The method of claim 1, wherein the second capacitance is continuously received.

7. The method of claim 1, wherein the comparing is performed by a processing component.

8. The method of claim 1, wherein providing the related information comprises sending a signal to a controller.

9. The method of claim 1, wherein providing the related information comprises conveying a sensory cue to a user.

10. An apparatus for monitoring a vehicular propulsion system battery to determine the presence of coolant leakage therein, the apparatus comprising:
    a sensor configured to receive a first and second capacitance related to discharge current of the battery;
    a processing component configured to compare the first and second capacitance;
    a relating mechanism for comparing capacitance to a coolant leakage; and
    an output source to a user to indicate coolant leakage.

11. The apparatus of claim 10, wherein the first capacitance and the second capacitance are Y capacitances.

12. The apparatus of claim 11, wherein the Y capacitances are obtained from a plurality of waveforms.

13. The apparatus of claim 12, wherein the waveforms are filtered to generate a plurality of DC components.

14. The apparatus of claim 13, wherein the plurality of DC components are separated to receive an isolation resistance and the Y capacitances.

15. The apparatus of claim 10, wherein the second capacitance is continuously received.

16. The apparatus of claim 10, wherein outputting comprises conveying a sensory cue to a user.

17. A method for monitoring a fuel cell stack to determine the presence of coolant leakage, the method comprising:
    receiving a first Y capacitance from a sensor that is coupled to the stack in such a way to measure indicia of coolant leakage;
    receiving a second Y capacitance from a sensor that is coupled to the stack in such a way to measure indicia of coolant leakage;
    comparing the first Y capacitance to the second Y capacitance; and
    providing a signal representative of the compared capacitances to a signal processing component.

18. The method of claim 17, whereupon generation of a signal that is indicative of coolant leakage in the fuel cell stack, the providing comprises notifying a user of the coolant leakage.

* * * * *